United States Patent [19]

Bruynesteyn et al.

[11] Patent Number: 4,571,387

[45] Date of Patent: Feb. 18, 1986

[54] BIOLOGICAL-ACID LEACH PROCESS

[75] Inventors: Albert Bruynesteyn, North Vancouver; Ralph P. Hackl, Burnaby; Richard W. Lawrence; Andrew I. Vizsolyi, both of Vancouver, all of Canada

[73] Assignee: British Columbia Research Council, Vancouver, Canada

[21] Appl. No.: 471,759

[22] Filed: Mar. 3, 1983

[30] Foreign Application Priority Data

Jan. 26, 1983 [CA] Canada .................................. 420245

[51] Int. Cl.⁴ ........................ B01D 11/00; C22B 3/00
[52] U.S. Cl. ..................................... 435/262; 423/27; 423/28; 423/41; 423/DIG. 17; 75/101 R; 75/115; 75/117
[58] Field of Search ............. 435/262; 75/101 R, 115, 75/117; 423/27, 28, 41, DIG. 17

[56] References Cited

U.S. PATENT DOCUMENTS

| | | | |
|---|---|---|---|
| 3,266,889 | 8/1966 | Duncan et al. | 75/101 |
| 3,305,353 | 2/1967 | Duncan et al. | 75/101 |
| 3,607,235 | 9/1971 | Duncan et al. | 75/101 |
| 3,637,371 | 1/1972 | Mackiw et al. | 75/101 |
| 3,856,913 | 12/1974 | McElroy et al. | 423/27 |
| 3,886,257 | 5/1975 | Snell | 423/27 |
| 3,949,051 | 4/1976 | Pawlek | 423/28 |
| 3,974,253 | 8/1976 | Snell et al. | 423/27 |
| 4,070,182 | 1/1978 | Genik-Sas-Berezowsky | 75/101 R X |

OTHER PUBLICATIONS

Deepak et al., J. Chem. Tech. Biotechnol., 1981, 31, No. 6, 358–362.
New Oxidative Leaching Process Uses Silver to Enhance Copper Recovery, *Engineering and Mining Journal*, Oct. (1977) pp. 100–105, Snell et al.
The Influence of Grain Size and Mineralogical Composition on the Leachability of Copper Concentrates, *Extractive Metallurgy of Copper*, vol. 2 (1976) pp. 691–705, Yannopoulos et al.
Electrochemistry in Silver Catalyst Ferric Sulphate Leaching of Chalcopyrite, *Process and Fundamental Considerations of Selected Hydrometallurgical Systems* (1981) pp. 327–338, Kuhn.
Behaviour and Effect of Silver on the Leaching of Complex Sulphidic Copper Concentrates, *Metal*, 36 (1982) pp. 737–739, Gerlach, J.

*Primary Examiner*—Robert J. Warden
*Assistant Examiner*—Shawn P. Foley
*Attorney, Agent, or Firm*—Christie, Parker & Hale

[57] ABSTRACT

A process for leaching copper from copper sulphide containing ore, in particular copper from chalcopyrite containing ore, is provided. The ore is preferably initially ground up and mixed with an aqueous acid leaching medium containing sulphide oxidizing bacteria, and a bacterial nutrient, and a catalytic amount of silver. Provision is made in the bacterial nutrient for a source of carbon dioxide and oxygen for the bacteria, both of which may be supplied by means of sparging with carbon dioxide enriched air. A bacterial compatible acid is added initially to the ore and leaching medium mixture and periodically during the process so that sulphide in the copper sulphide is oxidized in stoichiometric amounts to elemental sulphur. During leaching the oxidation potential is maintained between about 0.54 to 0.66 volts, most readily by initial addition of thiosulphate and dissolved copper.

17 Claims, 3 Drawing Figures

BIOLOGICAL-ACID LEACH PROCESS

FIELD OF THE INVENTION

This invention relates to a process for leaching copper from a copper sulphide containing ore, with consequent oxidation of sulphide to elemental sulphur.

BACKGROUND OF THE INVENTION

Bioleaching of sulphide containing ores is a phenomena which has been utilized for a number of years. In particular, bacterially assisted leaching of ores containing chalcopyrite, usually in combination with pyrite, has been extensively caried out in the presence of acidophilic *Thiobacillus ferrooxidans*, to recover copper from the chalcopyrite. It is known however, that other bacteria either alone or in combination with *T. ferrooxidans*, can accomplish the same purpose. Previously, the leaching solution for such ores was an aqueous acidic one containing a suitable bacterial nutrient. The low pH was favoured by the usually acidophilic bacteria, and also ensured solubilization of iron and other metals. Methods have been proposed in the past to increase the rate of reaction of the foregoing basic process. Such methods include addition of an appropriate amount of surfactant as disclosed in U.S. Pat. No. 3,266,889 to Duncan et al, and addition to the leaching medium of a catalytic amount of silver as is shown in U.S. Pat. No. 3,856,913 to McElroy et al. Carbon dioxide enriched air is typically provided during the leaching. Although the reactions which occur are not fully understood, the overall reactions in either the basic process described or the processes in the McElroy and Duncan patents appears to be:

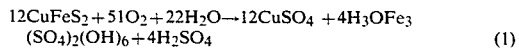
$$12CuFeS_2 + 51O_2 + 22H_2O \rightarrow 12CuSO_4 + 4H_3OFe_3(SO_4)_2(OH)_6 + 4H_2SO_4 \quad (1)$$

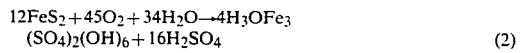
$$12FeS_2 + 45O_2 + 34H_2O \rightarrow 4H_3OFe_3(SO_4)_2(OH)_6 + 16H_2SO_4 \quad (2)$$

The solubilized copper, and the silver (as used in the process of the McElroy patent) are recovered by well known means.

A potential disadvantage of the foregoing prior processes is that they produce sulphuric acid. Because the disposal of sulphuric acid could constitute an environmental hazard, a neutralization step is required following leaching. Various hydrometallurgical processes for recovering copper from ores such as chalcopyrite and bornite and producing sulphur in the elemental form are known though. For example, U.S. Pat. No. 3,637,371 to Mackiw et al discloses a high temperature, oxygen pressure acid leach process for converting chalcopyrite to copper sulphate, basic ferric hydroxide and elemental sulphur. U.S. Pat. No. 3,949,051 to Pawlek discloses a process using silver to enhance copper leach rates and extraction from very finely ground chalcopyrite at high temperature and pressure. U.S. Pat. No. 3,886,257 to Snell again discloses a process for oxidatively leaching copper from copper ores in the presence of a catalytic amount of silver ions and an oxidative agent such as ferric sulphate, dilute sulphuric acid in the presence of added oxygen, or concentrated sulphuric acid.

It would be desirable then to have a relatively rapid bacterially assisted process for producing a metal from the metal sulphide containing ore, such as copper from chalcopyrite containing ore, which process does not result in the production of sulphuric acid, but preferably results in sulphide being oxidized to elemental sulphur, and which process can be carried on at relatively low temperature and relatively low pressure. Such a process would avoid a neutralization step following leaching, and would also result in readily separable and economically valuable, sulphur.

SUMMARY OF THE INVENTION

A process for leaching copper from a copper sulphide containing ore is provided. The process comprises contacting the ore with an aqueous acid leaching medium containing sulphide oxidizing bacteria, and a bacterial nutrient. A suitable oxidation potential is maintained, and a sufficient amount of bacterial compatible acid is added to the ore and leaching medium mixture, so as to produce elemental sulphur from sulphide in the ore.

In a second embodiment of the process, copper is leached from a chalcopyrite containing ore. The ore is contacted with an aqueous acid leaching medium containing *T. ferrooxidans* bacteria, a catalytic amount of silver, and a bacterial nutrient containing carbon dioxide and oxygen. The temperature is maintained between about 10° C. and 40° C. and the oxidation potential between about 0.54 to 0.66 volts, and a sufficient amount of bacterial compatible acid is periodically added to the ore and leaching medium mixture, so as to produce elemental sulphur from sulphide in the ore. Preferably, the leaching medium contains sufficient thiosulphate and dissolved copper so as to maintain the oxidation potential between about 0.54 to 0.66 volts.

Advantageously, the ore is mixed with the leaching medium, and the process additionally comprises agitating the mixture while simultaneously sparging with a carbon dioxide and oxygen containing gas mixture. Usefully, the acid in the leaching medium and the acid periodically added are sulphuric acid.

Preferably, the leaching medium has a pH between about 1.5 and 3.0, and more preferably 2.0 and 2.5, and sufficient acid is periodically added to maintain the pH within the respective ranges.

The amount of silver utilized is advantageously between about 100 to 4,000 milligrams of dispersed silver per kilogram of chalcopyrite. In addition, the amount of dissolved copper and thiosulphate is preferably 10 to 30 grams per liter, and 2 to 25 grams per liter respectively. Prior to carrying out the above process, the ore is usefully ground to a size of less than about 200 mesh. Such ore is preferably mixed with leaching medium in an amount to obtain a mixture having 2% to 60% by weight of the ore. Carbon dioxide enriched air is used to sparge the ore and leaching medium mixture.

Usefully, the ore is ground to a particle size of less than about 325 mesh, and the carbon dioxide enriched air contains from 0.1 to 10% carbon dioxide. Silver is usefully added to the leaching medium in the form of elemental silver, silver sulphide, silver nitrate, silver chloride, or silver sulphate.

Advantageously, the air pressure above the ore and the leaching medium mixture is maintained between 0.5 to 10 atmospheres, and preferably maintained at about 1 atmosphere.

DRAWINGS

The embodiments of the invention will now be described in detail with reference to the drawings in which:

FIG. 1 graphically illustrates copper leaching using the method of the present invention to leach a particular chalcopyrite concentrate ore sample;

FIG. 2 graphically illustrates copper leaching using the method of the present invention to leach the same ore sample as in FIG. 1, but with increased thiosulphate concentration in the leaching medium; and FIG. 3 graphically illustrates the rate of copper leaching using the method of the present invention, for another chalcopyrite concentrate ore sample.

DESCRIPTION OF THE PREFERRED EMBODIMENTS

Figure 1:
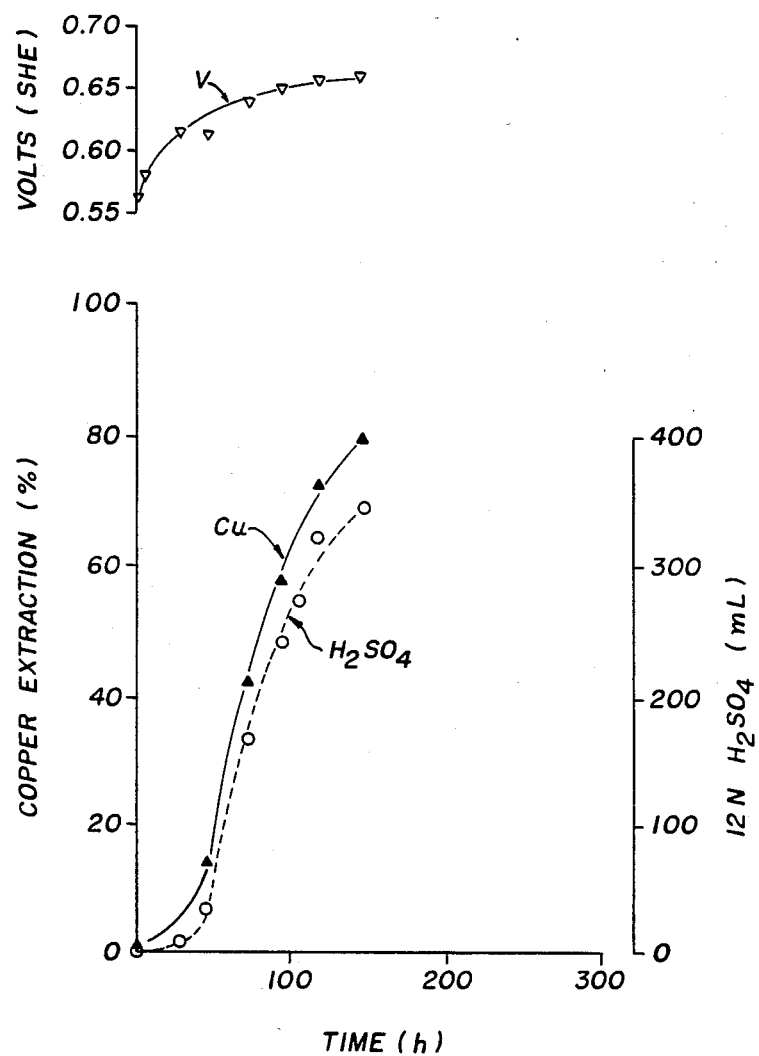

It has been discovered that copper can be leached from a chalcopyrite containing ore (the term "ore" throughout this application including concentrate), by mixing the ore with an aqueous leaching medium. The leaching medium contains *T. ferrooxidans* bacteria, a bacterial nutrient, and a catalytic amount of silver. The leaching medium is acidified with a bacterial compatible acid, for example sulphuric acid, to a pH of between 1.5 and 3.0, and preferably between 2.0 and 2.5, and provided with a source of carbon dioxide and oxygen. In addition, the leaching medium is provided with sufficient thiosulphate and dissolved copper (which can both be added initially to the leaching medium or produced in situ during the leaching process) as to maintain the oxidation potential at between about 0.54 to 0.66 volts (as measured with reference to SHE, which is used as the reference with respect to every oxidation potential expressed in this application) throughout the leaching process. The thiosulphate and dissolved copper are preferably provided in the leaching medium by initially adding between about 2 to 25 grams of thiosulphate per liter of solution and about 10 to 30 grams of copper as copper sulphate per liter of solution, directly to the leaching medium. The thiosulphate apparently serves to complex silver and dissolved copper and thereby promote leaching. Although neither thiosulphate or dissolved copper need be provided initially in the leaching medium, their provision appears to provide good results more consistently than in their absence.

Throughout the reaction, acid is periodically ("periodically" being used to include "continuously") added to maintain the pH of the mixture between 1.0 and 3.5, and preferably between 2.0 and 2.5. The addition of acid ensures dissolution of metals in the ore as sulphate, while sulphide is converted to elemental sulphur. The reaction is conducted at a temperature between about 10° C. and 40° C. The result of the preceding reaction is the leaching of copper from the chalcopyrite, and production of elemental sulphur from the sulphide. The overall primary reaction appears to be:

$$CuFeS_2 + 4H^+ + 2O_2 \rightarrow Cu^{+2} + Fe^{+2} + 2H_2O + 2S° \quad (3)$$

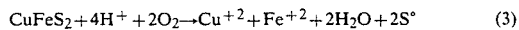

Thus, sulphuric acid is actually consumed and it is necessary to maintain the pH in the preceding range, preferably in the range of 2.0 to 2.5, by periodically adding acid. It has been found that the rate of consumption of sulphuric acid will be between 0.5 and 1.25 moles of acid per mole of sulphur produced, depending upon the degree of ferric ion hydrolysis, and the nature of the hydrolysis products. Following leaching, the solid residue typically contains unleached chalcopyrite, unattacked pyrite, basic iron sulphate, and elemental sulphur.

Prior to leaching the ore, it is ground to a particle size of less than about 200 mesh standard Tyler screen, and preferably at least 90% to less than 400 mesh, so as to provide a large surface area of contact between the chalcopyrite and leaching medium. The silver is preferably provided in dispersed form, either as elemental silver or a silver compound such as silver sulphide, silver nitrate, silver chloride, or silver sulphate, in an amount of 100 to 4,000 milligrams of dispersed silver per kilogram of chalcopyrite, and preferably between 500 to 2,000 mg of silver per kilogram of chalcopyrite. The ore and leaching medium mixture is preferably agitated while simultaneously providing carbon dioxide and oxygen, in the form of carbon dioxide enriched air sparged into the mixture, the best results being obtained where the carbon dioxide enriched air contains from 0.1 to 10% carbon dioxide.

Three examples of the method of the present invention are described below. The leaching in each case was performed under about one atmosphere of air pressure.

EXAMPLE 1

400g of a chalcopyrite concentrate assaying 27.8% Cu, 28.0% Fe and 31.1% S were leached in 1.8 L of an aqueous leaching medium consisting of a nutrient solution containing 3.0 g/L $(NH_4)_2SO_4$, 0.1 g/L KCl, 0.5 g/L $K_2HPO_4$, 0.5 g/L $MgSO_4.7H_2O$, 0.01 g/L $Ca(NO_3)_2$. The leaching medium also contained 1.16g $Ag_2SO_4$, 142.8g $CuSO_4.5H_2O$, 12.4g $Na_2S_2O_3.5H_2O$ and an active culture of *Thiobacillus ferrooxidans*. The pH of the ore and leaching medium mixture was adjusted to 2.2 with sulphuric acid and maintained at this value by a set up in which acid was pumped in as required from a reservoir using a pH controller set at 2.2. Leaching was carried out in a 3L plastic baffled tank equipped with an overhead stirrer with a turbine impeller at a temperature of 35° C. Oxygen and carbon dioxide were provided by carbon dioxide enriched (1%) air sparging.

The leaching curve obtained is shown in FIG. 1 in which the solid line represents the leaching rate of copper, while the broken line illustrates the rate at which sulphuric acid was continuously added. The oxidation potential expressed in volts (Standard Hydrogen Electrode), is also shown.

The copper extraction obtained was 78.8%, with a final residue produced weighing 400g and assaying 6.1% Cu, 18.7% Fe, 35.8% $S_T$ and 22.4% $S°$. Conversion of sulphide sulphur in chalcopyrite to the elemental form was 77.1%, for a corresponding 1.96 moles of elemental sulphur formed per mole of copper extracted in accordance with equation (3). Sulphuric acid consumption was 0.76 moles per mole of elemental sulphur formed.

EXAMPLE 2

In example 2, the procedure of example 1 was repeated using the same concentrate except that 24.8g of $Na_2S_2O_3.5H_2O$ was provided in the leaching medium.

Figure 2:
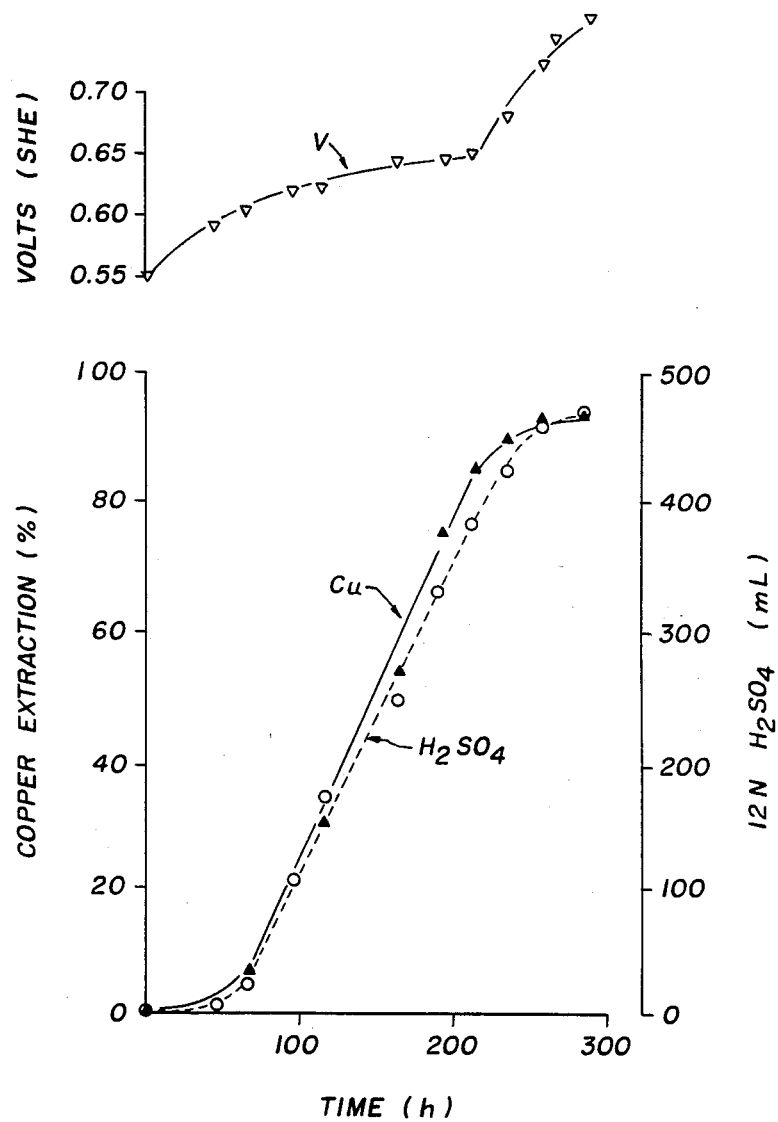

The leaching curve obtained is shown in FIG. 2, in which the solid line illustrates the leaching rate of copper, while the broken line illustrates the rate at which sulphuric acid was continuously added. The oxidation potential expressed in volts (SHE), is also shown.

The copper extraction obtained was 92.6%, with a final residue produced weighing 386.5g and containing unreacted chalcopyrite, the unattacked pyrite, elemental sulphur formed in the reaction, precipitated basic iron hydroxides and insolubles, with an analysis of 2.2% Cu, 22.0% Fe, 38.6% $S_T$ and 28.0% $S°$.

Conversion of sulphide sulphur in chalcopyrite to elemental sulphur was 93.0% for a corresponding 2.00 moles of elemental sulphur formed per mole of copper extracted. Sulphuric acid consumption was 0.86 moles per mole of elemental sulphur formed.

EXAMPLE 3

In this example, 4000g of a different chalcopyrite concentrate assaying 26.0% Cu, 29.0% Fe and 29.8% S were leached in 18.8 L of a leaching medium consisting of a nutrient solution as used in Example 1. The leaching medium also contained 11.56g of silver sulphate and an active culture of *Thiobacillus ferrooxidans*, but no thiosulphate or copper sulphate was added to the leaching medium. The pH of the ore and leaching medium mixture was adjusted to 2.5 using sulphuric acid and thereafter maintained at this value by sulphuric acid addition as described in Example 1. Leaching was performed in a 40 L stainless steel baffled tank with turbine agitation at 35° C. Oxygen and carbon dioxide were provided in the leaching medium by means of carbon dioxide enriched (1%) air sparging.

Figure 3:
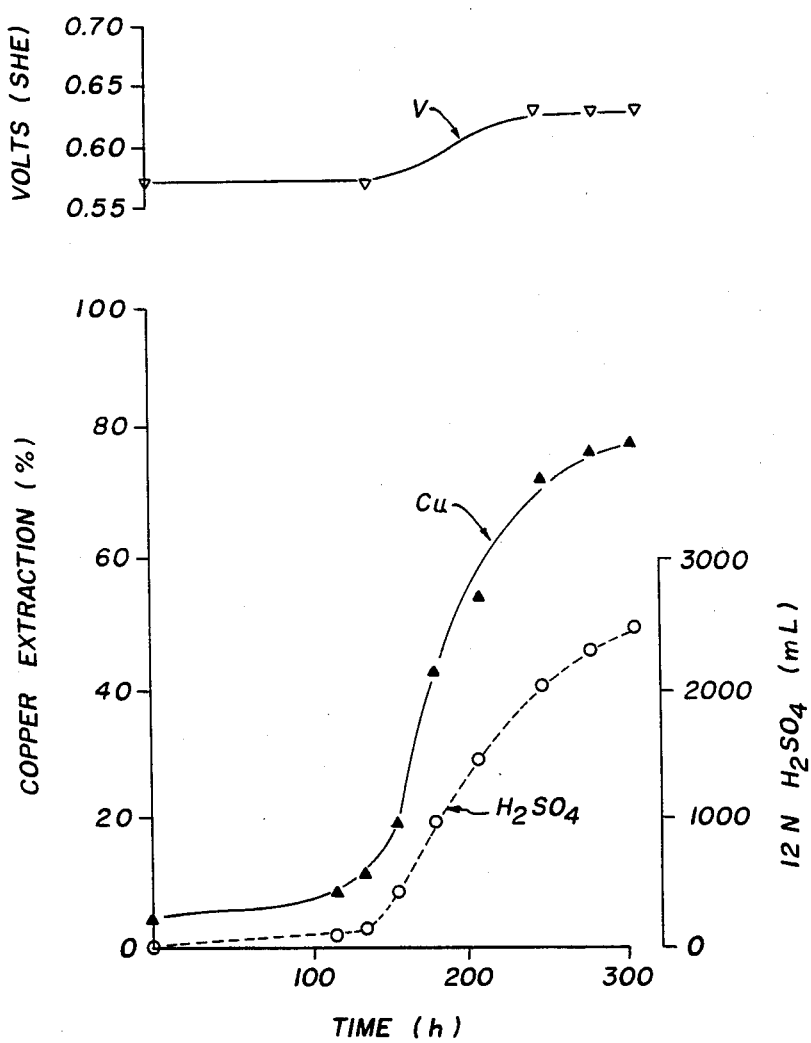

The leaching curve obtained is shown in FIG. 3 in which the solid line represents the leaching rate of copper, while the broken line illustrates the rate at which sulphuric acid was continuously added. The oxidation potential expressed in volts (SHE), is also shown.

The copper extraction obtained was 77.4%, with a final residue produced weighing 4155g and assaying 6.4% Cu, 27.3% Fe, 32.5% $S_T$ and 19.3% $S^o$. Conversion of sulphide sulphur in chalcopyrite to the elemental form was stoichiometric, with 2.06 moles of elemental sulphur formed per mole of copper extracted. Sulphuric acid consumption was 0.61 moles per mole of elemental sulphur produced.

It will be seen from the above Examples then, that a high, relatively rapid recovery of copper from chalcopyrite containing ore is possible with the present method, in which sulphide in the leached chalcopyrite, is oxidized to elemental sulphur. Thus, sulphuric acid production as a result of leaching from chalcopyrite is eliminated, and economically valuable sulphur is produced. The copper containing leach solution can in practice be separated from the silver and from the sulphur bearing solid leach residue by well known processes, such as gravity settling or filtration. The copper dissolved in the leached solution is recovered again by well known methods, such as cementation utilizing scrap iron, solvent extraction, electrowinning or precipitation as an insoluble salt. Any unleached sulphide minerals and elemental sulphur in the solid leach residue, can be recovered. Sulphuric acid which is recovered from the electrowinning method can be recycled to the leaching process.

The elemental sulphur in the solid leach residue is recovered by known recovery methods, such as solvent extraction, steam stripping or hot filtration. The silver, and any precious metals (which may have been in the ore), in the solid leach residue may be recovered by known methods, such as leaching by chlorination, thiosulphate solutions, or by cyanidation.

As will be apparent to those skilled in the art in light of the foregoing disclosure, many alterations and modifications are possible in the practice of this invention without departing from the spirit or scope of it. Accordingly, the scope of the invention is to be construed in accordance with the substance defined by the following claims.

We claim:

1. A process for leaching copper from a copper sulphide containing ore, comprising:
   (a) contacting the ore with an aqueous acid leaching medium containing sulphide oxidizing bacteria, and a bacterial nutrient; and
   (b) maintaining a suitable oxidation potential, and periodically adding a sufficient amount of bacterial compatible acid to the ore and leaching medium mixture, so as to produce elemental sulphur rather than sulphuric acid from sulphide in the ore.

2. A process for leaching copper from a chalcopyrite containing ore, comprising:
   (a) contacting the ore with an aqueous acid leaching medium containing *T. ferrooxidans* bacteria, a catalytic amount of silver, and a bacterial nutrient containing carbon dioxide and oxygen; and
   (b) maintaining the temperature between about 10° C. and 40° C. and the oxidation potential between about 0.54 to 0.66 volts, and periodically adding a sufficient amount of bacterial compatible acid to the ore and leaching medium mixture, so as to produce elemental sulphur rather than sulphuric acid from sulphide in the ore.

3. A process as described in claim 2 wherein the leaching medium contains sufficient thiosulphate and dissolved copper so as to maintain the oxidation potential between about 0.54 to 0.66 volts.

4. A process as described in claim 3, wherein the ore is mixed with the leaching medium, additionally comprising agitating the mixture while simultaneously sparging with a carbon dioxide and oxygen containing gas mixture.

5. A process as described in claim 4 wherein the acid in the leaching medium and the acid periodically added are sulphuric acid.

6. A process as described in claim 3, 4, or 5 wherein the leaching medium has a pH between about 1.5 and 3.0 and sufficient acid is periodically added to maintain the pH within that range.

7. A process as described in claim 3, 4, or 5 wherein the leaching medium has a pH between about 2.0 and 2.5 and sufficient acid is periodically added to maintain the pH within that range.

8. A process as described in claim 5 wherein the leaching medium contains about 100 to 4,000 milligrams of dispersed silver per kilogram of chalcopyrite, about 10 to 30g/L of dissolved copper, and about 2 to 25 g/L. of thiosulphate.

9. A process as described in claim 8 wherein the leaching medium has a pH between about 1.5 and 3.0 and sufficient acid is periodically added to maintain the pH within that range.

10. A process as described in claim 8, wherein the leaching medium has a pH between 2.0 and 2.5 and sufficient acid is periodically added to maintain the pH within that range.

11. A process for leaching copper from a chalcopyrite containing ore, comprising:
    (a) grinding the ore to a particle size of less than about 200 mesh;
    (b) mixing the ore with an aqueous leaching medium in an amount to obtain a mixture having 2% to 60% by weight of the ore, the leaching medium being acidified with sulphuric acid to a pH between about 1.5 and 3.0, and containing *T. ferrooxidans* bacteria, a bacterial nutrient, about 100 to 4,000 mg of dispersed silver per kilogram of chalcopyrite, about 10 to 30g/L dissolved copper, and about 2 to 25g/L thiosulphate;

(c) agitating the ore and leaching medium mixture while simultaneously sparging with carbon dioxide enriched air;

(d) maintaining the temperature between about 10° C. and 40° C., and the oxidation potential between about 0.54 to 0.66 volts, and periodically adding a sufficient amount of sulphuric acid to the mixture to maintain the pH between 1.5 and 3.0, so as to produce elemental sulphur rather than sulphuric acid from sulphide in the ore.

12. A process as described in claim 11 wherein the pH of the leaching medium is between 2.0 and 2.5 and is maintained between 2.0 and 2.5.

13. A process as described in claim 12 wherein the ore is ground to a particle size of less than about 325 mesh, and wherein carbon dioxide enriched air contains from 0.1 to 10% of carbon dioxide.

14. A process as described in claim 3, 5 or 12 wherein the silver is added to the leaching medium in the form of a silver containing substance selected from the group consisting of silver, silver sulphide, silver nitrate, silver chloride, or silver sulphate.

15. A process as described in claim 11, 12, or 14 wherein the ore is mixed with the aqueous leaching medium in an amount to obtain a mixture having about 20% to 30% by weight of the ore.

16. A process as described in claim 3, 5 or 12 additionally comprising maintaining an air pressure above the ore and leaching medium mixture of between 0.5 to 10 atmospheres.

17. A process as described in claim 3, 5 or 12 additionally comprising maintaining an air pressure above the ore and leaching medium mixture of about 1.0 atmosphere.

* * * * *